United States Patent [19]

Blakeslee

[11] Patent Number: 4,522,018
[45] Date of Patent: Jun. 11, 1985

[54] WINDROW REVERSER FOR WINDROWER DRAPER HEADER

[75] Inventor: Edward A. Blakeslee, New Holland, Pa.

[73] Assignee: Sperry Corporation, New Holland, Pa.

[21] Appl. No.: 532,932

[22] Filed: Sep. 16, 1983

[51] Int. Cl.³ ..................... A01D 35/12; A01D 57/20
[52] U.S. Cl. ...................................... 56/181; 56/11.2; 56/192
[58] Field of Search ................... 56/11.2, 11.9, 14.5, 56/192, 181

[56] References Cited

U.S. PATENT DOCUMENTS

| | | | |
|---|---|---|---|
| 3,214,002 | 10/1965 | Kirkpatrick et al. | 56/192 |
| 3,343,347 | 9/1967 | Burrough et al. | 56/11.2 |
| 3,973,379 | 8/1976 | Ecker et al. | 56/11.2 |
| 4,182,098 | 1/1980 | Kass | 56/192 |
| 4,429,517 | 2/1984 | Lohrentz et al. | 56/192 |

OTHER PUBLICATIONS

Versatile, "Hydrostatic Self-Propelled Swathers SP4400 & SP400", Copyright 1980.

Primary Examiner—Paul J. Hirsch
Attorney, Agent, or Firm—Larry W. Miller; Frank A. Seemar; Darrell F. Marquette

[57] ABSTRACT

A laterally shiftable draper header for a windrower is disclosed wherein a pair of draper sections are laterally shiftable on the header subframe to vary the position of the crop discharge opening between left, right and central positions. When the discharge opening is positioned at a central location between separated draper sections, it is necessary that the draper conveyors rotate in opposing directions to deliver crop material to the discharge opening. However, when the draper sections are positioned adjacent one another and shifted to one side of the machine or the other it is necessary for the draper conveyors to rotate in the same direction to convey crop to the discharge opening. A reversing mechanism for changing the direction of rotation of one of the draper sections relative to the other in response to the relative position of the other draper section is provided and includes a push rod for sensing the proximate location of the other draper section to cause the associated draper conveyor to reverse direction of rotation.

15 Claims, 15 Drawing Figures

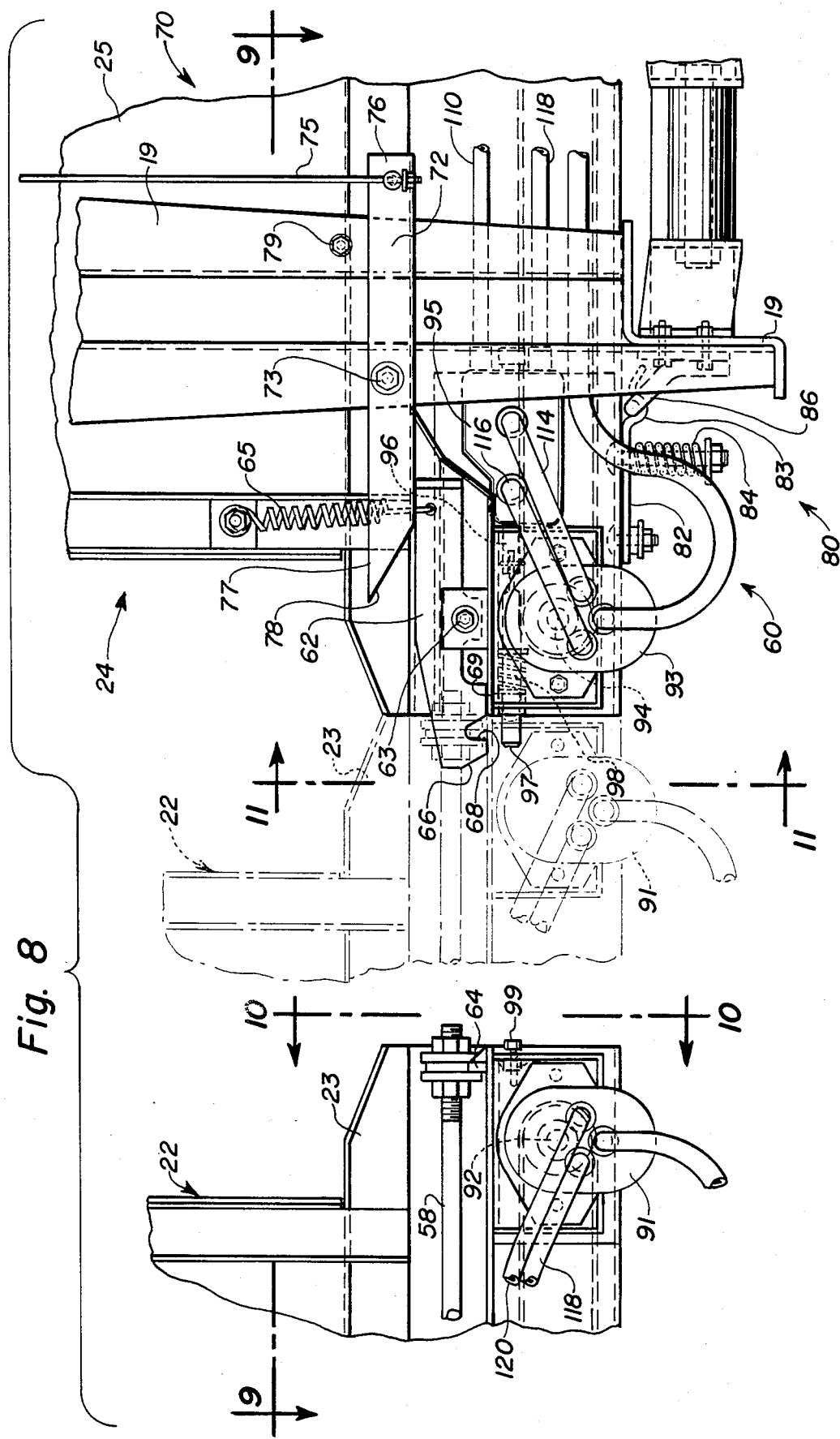

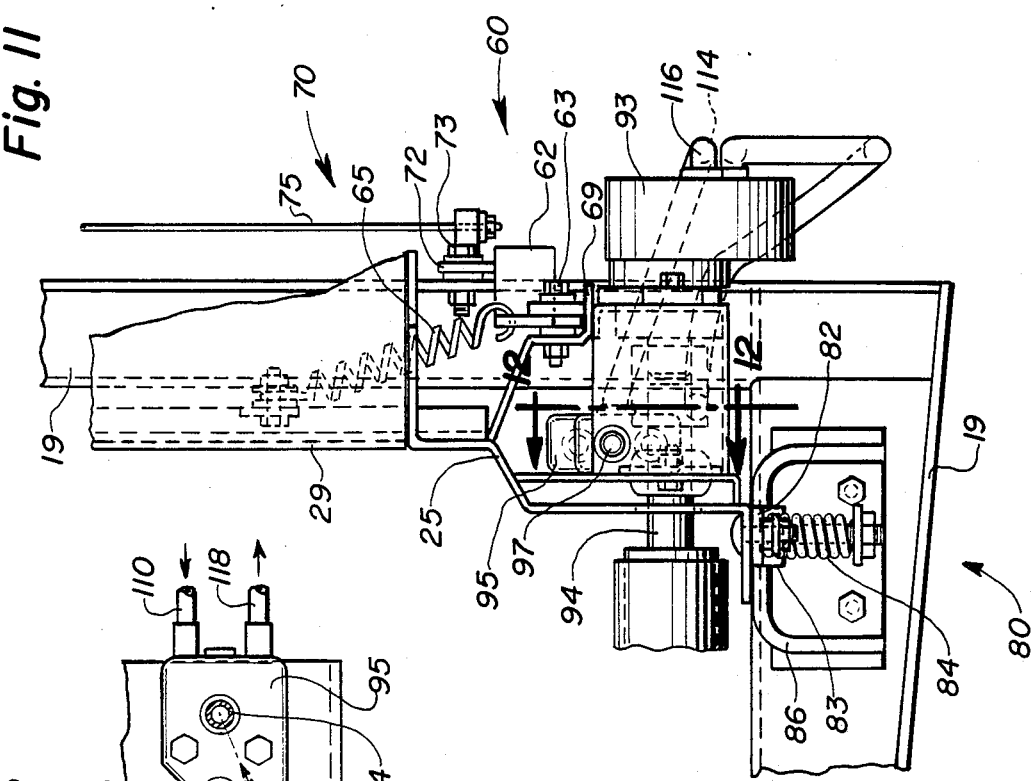
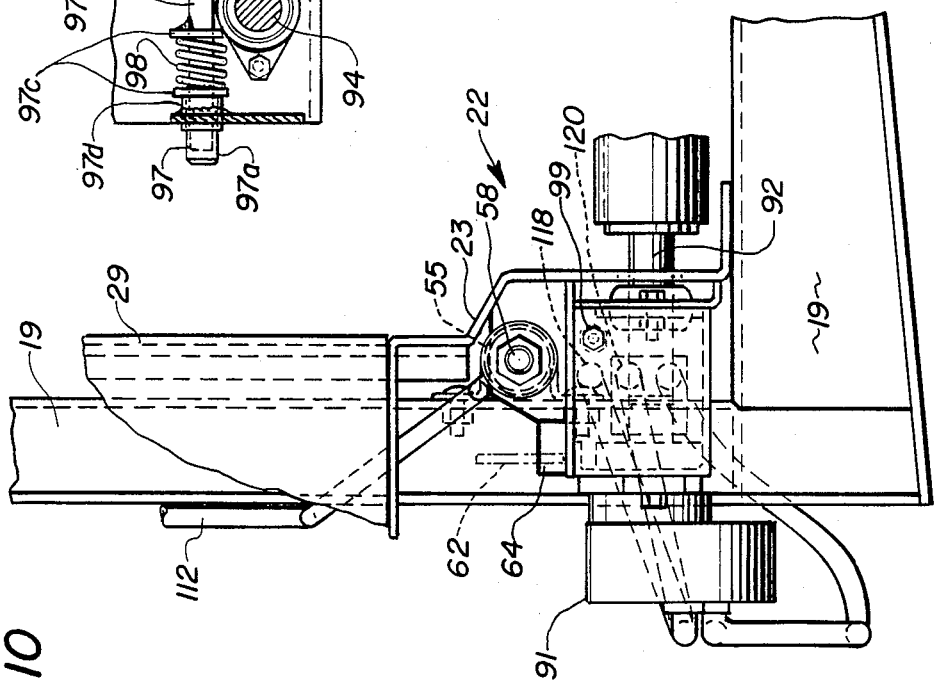

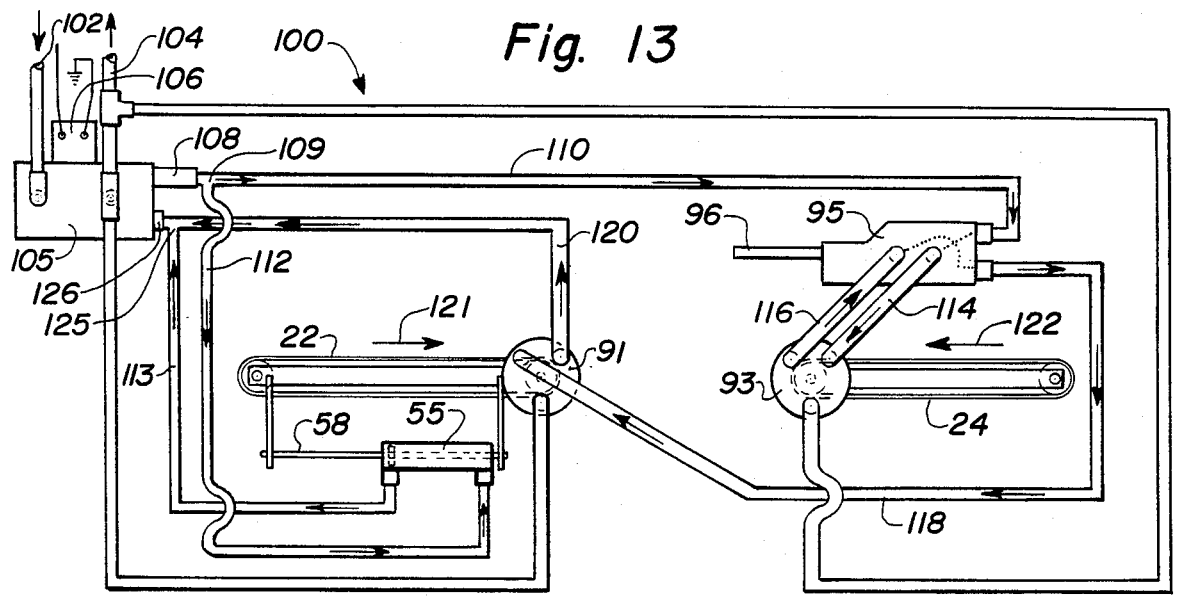

4,522,018

WINDROW REVERSER FOR WINDROWER DRAPER HEADER

BACKGROUND OF THE INVENTION

The present invention relates generally to draper headers for windrowers having laterally shiftable draper sections and, more particularly, to a reversing mechanism for changing the direction of rotation of one draper section in response to the relative position of the other draper section.

The provision of a pair of laterally shiftable draper sections enables the operator to choose the location of the crop discharge opening at right, left or central positions. When the draper sections are separated with the crop discharge opening positioned therebetween, it is necessary for the draper conveyors to rotate in opposite directions to deliver crop material into the discharge opening. When the draper sections are shifted adjacent one another to form a generally continuous conveyor to consolidate severed crop material into a windrow at either the left or right ends of the header, the conveyors must rotate in the same direction to convey the severed crop to the discharge opening. It can be a somewhat cumbersome task to change the direction of rotation of one or both of the draper sections to conform to the relative location of the discharge opening and have the severed crop consolidated thereto.

SUMMARY OF THE INVENTION

It is an object of this invention to overcome the aforementioned disadvantages of the prior art by providing a reversing mechanism for a draper header to change the direction of rotation of one of the laterally shifting draper sections in response to the relative position of the other shiftable draper section.

It is another object of this invention to provide a mechanism for sensing the relative positions of the two draper sections to actuate a draper reversing mechanism.

It is a feature of this invention that the direction of rotation of one of the shifting draper sections is reversed to rotate in the same direction as the other draper section when the two draper sections are moved adjacent one another.

It is an advantage of this invention that no operator input is necessary to change the direction of rotation of one draper conveyor relative to the other.

It is another feature of this invention that the draper sections rotate in the same direction when adjacent one another and in opposing directions when separated.

It is still another object of this invention that the reversing mechanism is spring loaded toward a position to effect rotation of the draper sections in opposing directions.

It is a further object of this invention to provide a reversing mechanism for a draper windrower which is durable in construction, inexpensive of manufacture, carefree of maintenance, facile in assemblage and simple and effective in use.

These and other objects, features and advantages are accomplished according to the instant invention by providing a laterally shiftable draper header for a windrower wherein a pair of draper sections are laterally shiftable on the header subframe to vary the position of the crop discharge opening between left, right and central positions. When the discharge opening is positioned at a central location between separated draper sections, it is necessary that the draper conveyors rotate in opposing directions to deliver crop material to the discharge opening. However, when the draper sections are positioned adjacent one another and shifted to one side of the machine or the other it is necessary for the draper conveyors to rotate in the same direction to convey crop to the discharge opening. A reversing mechanism for changing the direction of rotation of one of the draper sections relative to the other in response to the relative position of the other draper section is provided and includes a push rod for sensing the proximate location of the other draper section to cause the associated draper conveyor to reverse direction of rotation.

BRIEF DESCRIPTION OF THE DRAWINGS

The advantages of this invention will become apparent upon consideration of the following detailed disclosure of the invention, especially when taken in conjunction with the accompanying drawings wherein:

FIG. 8 is an enlarged partial rear elevational view of the central portion of the draper header seen in FIG. 5 corresponding to lines 8—8, the movement of the left draper section being shown in phantom;

FIG. 10 is a detail elevational view of the rearward portion of the left draper section corresponding to lines 10—10 of FIG. 8;

FIG. 11 is a detail elevational view of the rearward portion of the right draper section corresponding to lines 11—11 of FIG. 8;

FIG. 12 is a detail cross-sectional view of the reversing valve affixed to the right draper section as taken along lines 12—12 of FIG. 11;

FIG. 13 is a diagrammatic view of the hydraulic system for the draper header with the draper sections being positioned in their respective extreme transverse positions for a central crop discharge;

FIG. 14 is a diagrammatic view of the hydraulic system for the draper header with the draper sections shifted to the right side to permit a crop discharge to the left side of the header; and FIG. 15 is a diagrammatic view of the hydraulic system with the draper sections shifted to the left side to permit a crop discharge to the right side of the header.

DETAILED DESCRIPTION OF THE PREFERRED EMBODIMENT

Figure 1:
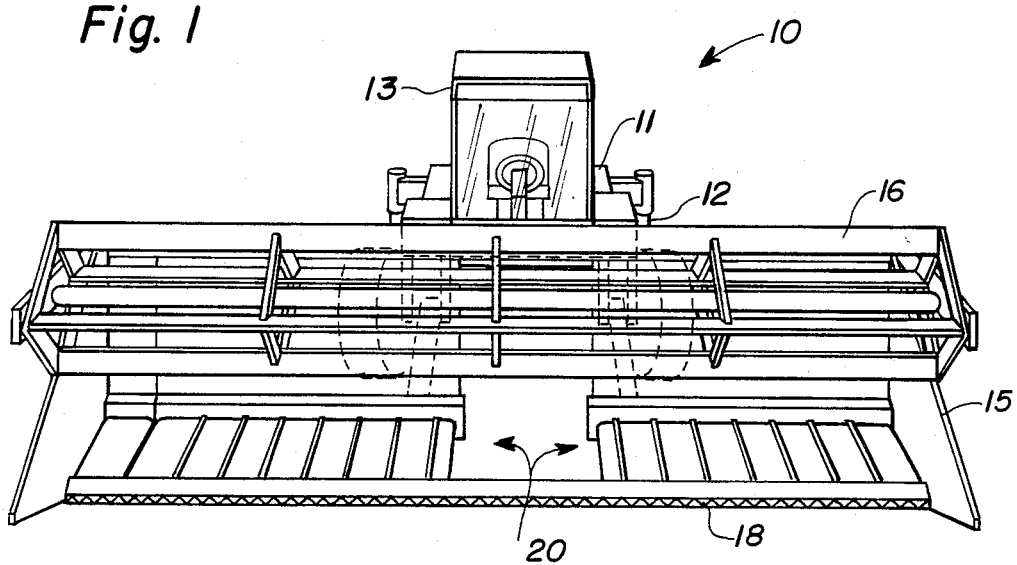
FIG. 1 is a front elevational view of a windrower equipped with a draper header, set up for center delivery of the crop material, incorporating the principles of the instant invention.

Referring now to the drawings and, particularly, to FIG. 1, a front elevational view of a windrower 10 equipped with a draper header can be seen. Any left and right references are used as a matter of convenience and are determined by standing at the rear of the machine, facing the forward end, the direction of travel. The windrower 10 is comprised of a tractor 11 having a wheeled frame 12 permitting movement across the field. An operator's platform 13 is mounted on the frame 12 to provide an overall view of the harvesting operation occurring before him. The header 15 is forwardly connected to the frame 12 to engage standing crop material as the windrower 10 moves across the field. The header 15 includes a reel 16 driven by a hydraulic motor 38 connected to a source of hydraulic power by hoses 39 to sweepably engage standing crop over a cutterbar 18 which severs the standing crop to be conveyed rearwardly onto the draper conveyor 20 for consolidating the severed crop into a windrow.

Figure 2:
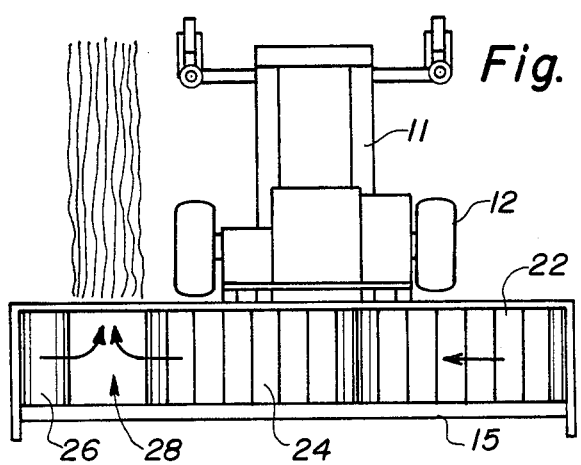
FIG. 2 is a schematic top plan view of the windrower seen in FIG. 1 with the draper sections being set up for right side discharge.
Figure 3:
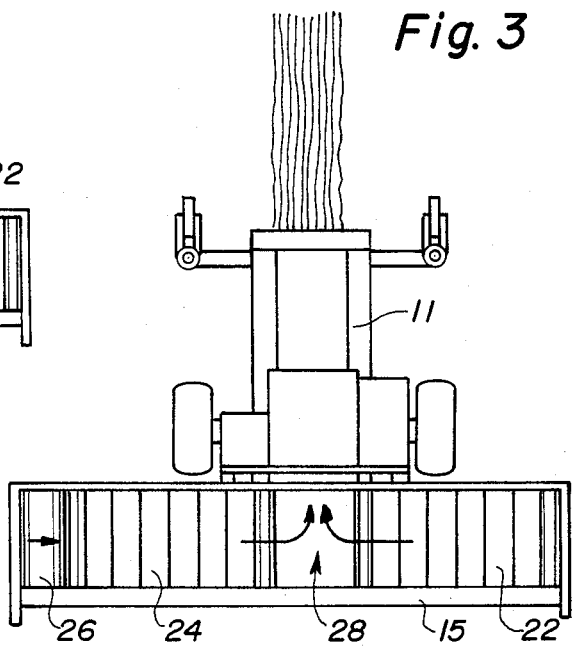
FIG. 3 is a schematic top plan view similar to FIG. 2 with the draper section set up for center crop discharge.
Figure 4:
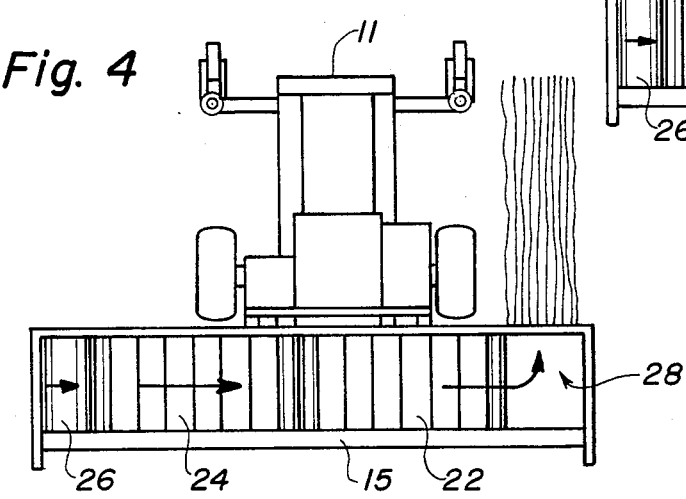
FIG. 4 is a schematic top plan view similar to FIGS. 2 and 3 with the draper sections set up for left side crop discharge.

As seen in FIGS. 1-4, the draper conveyor 20 includes a left draper section 22, a right draper section 24 and a stub or short draper section 26 disposed along the right side of the header 15. The left and right draper sections 22,24 are movably mounted on the header subframe 19 for transverse movement relative thereto. Since the cumulative width of the draper sections 22,24,26 is less than the total width of the header 15, a discharge opening 28 is provided for the discharge of crop material off the draper conveyor 20 onto the ground into a windrow. By shifting the left and right draper sections 22,24 to an extreme left transverse position, the discharge opening 28 is positioned between the short draper section 26 and the right draper section 24, as shown in FIG. 2. As seen in FIG. 4, the left and right draper sections 22,24 can be shifted to an extreme right transverse position adjacent the short draper 26 to position the discharge opening 28 along the left end of the header 15. Alternatively, the left and right draper sections 22,24 can each be moved into respective extreme left and right transverse position to position the discharge opening 28 generally centrally of the header 15 to discharge the crop windrow beneath the tractor 11.

Figure 5:
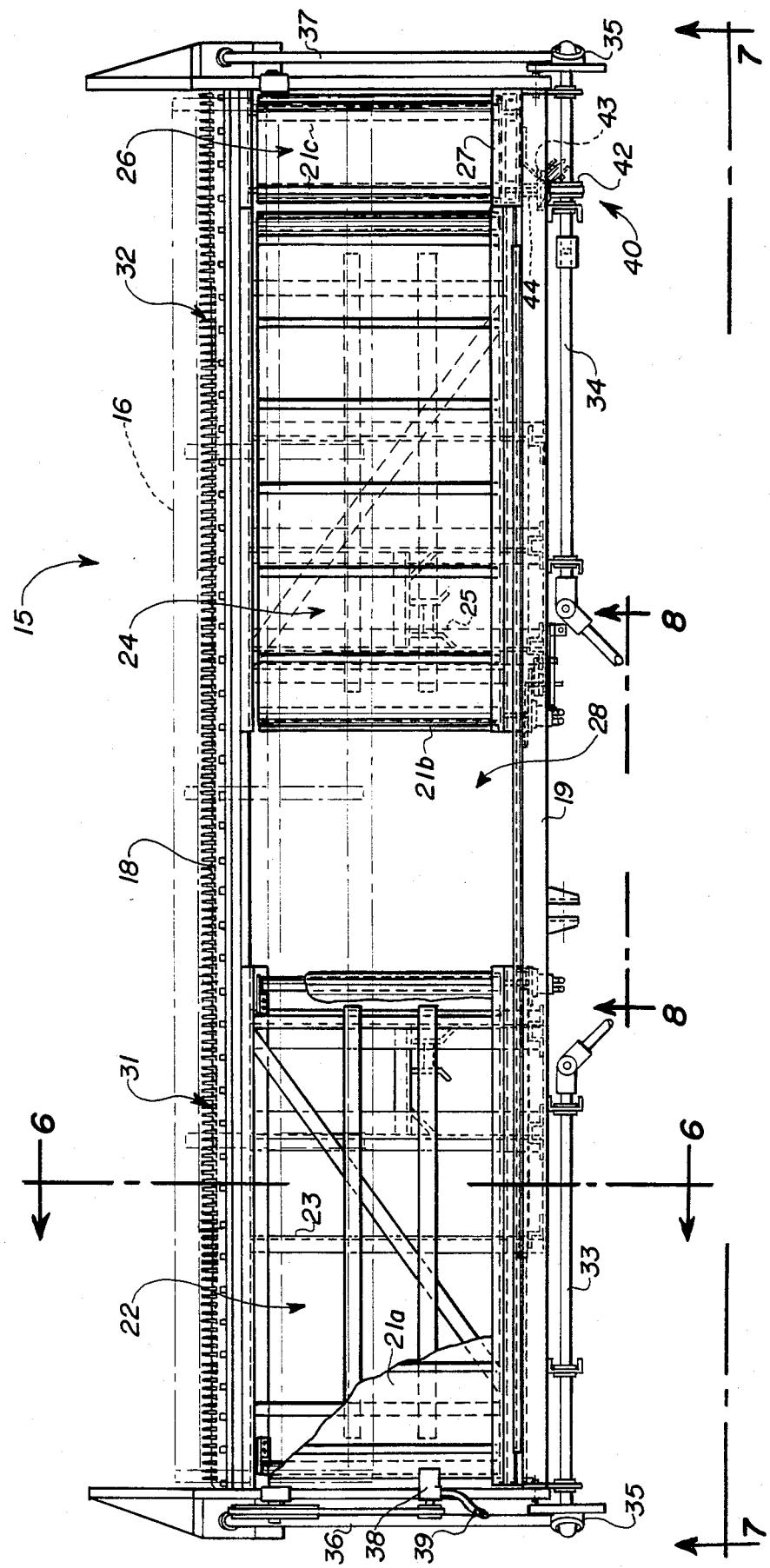
FIG. 5 is an enlarged top plan view of the draper header shown in FIG. 1 with portions of the left draper section being broken away and the reel being shown in phantom for purposes of clarity.
Figure 6:
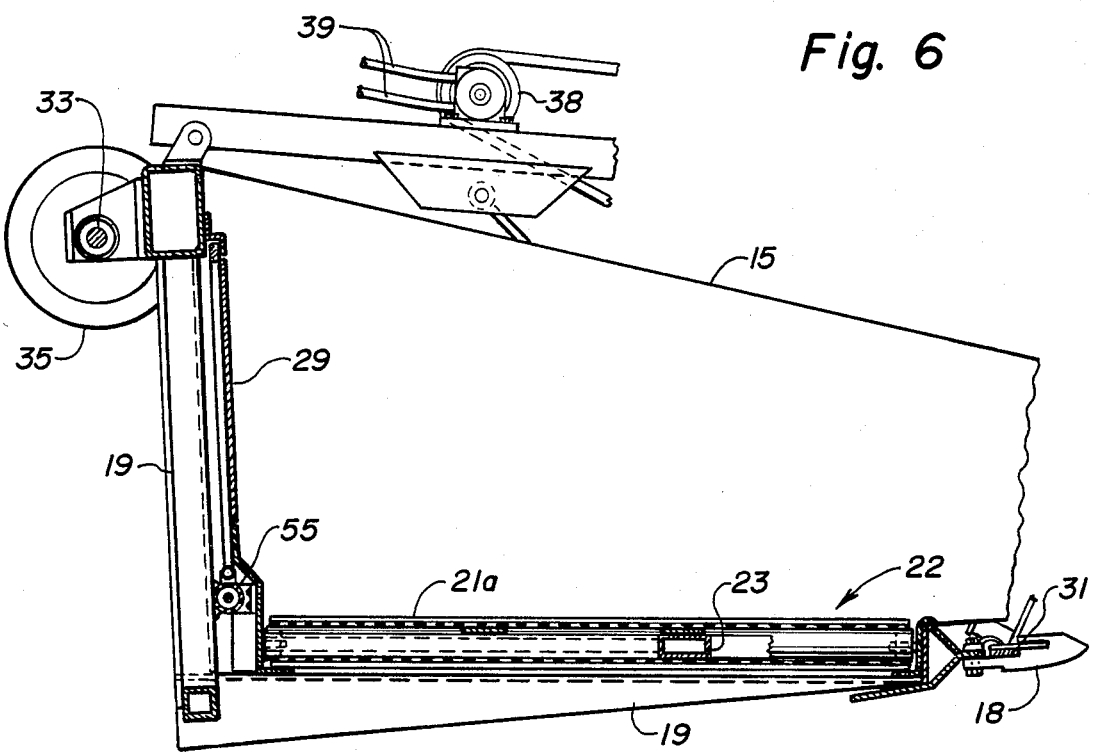
FIG. 6 is an enlarged cross-sectional view of the draper header seen in FIG. 5 taken along lines 6—6 through the left draper section, the reel and crop divider being broken away for clarity.
Figure 7:
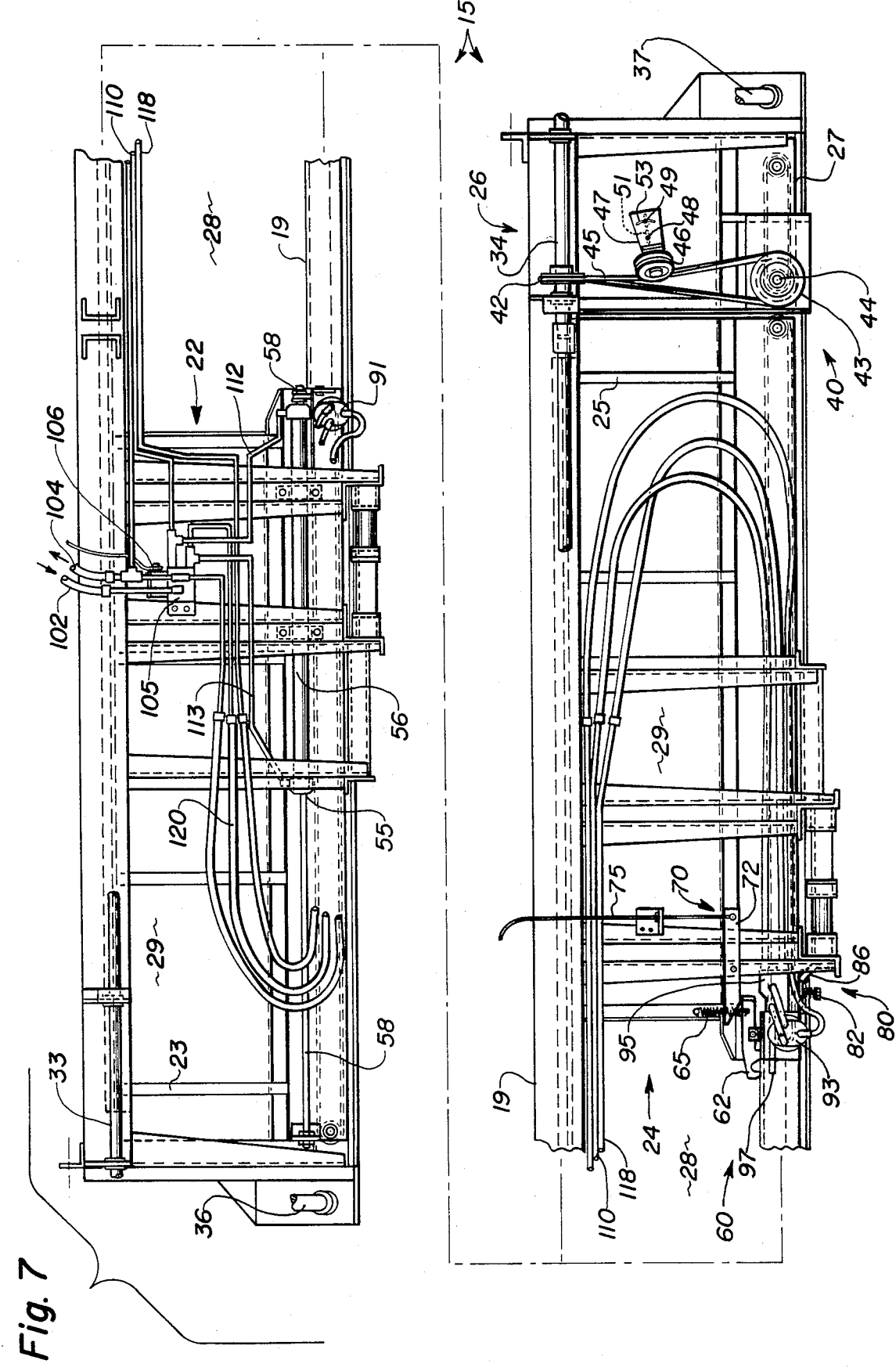
FIG. 7 is a partial enlarged rear elevational view of the draper header shown in FIG. 5 corresponding to lines 7—7, the header being broken into two halves along a match line M, the reel and certain drive components being broken away for purposes of clarity.

Referring now to FIGS. 5, 6 and 7, the structural details of the draper header shown in FIG. 1 can be seen. Each draper section 22,24,26 is generally comprised of a slatted endless draper 21a,21b,21c, respectively, mounted for rotation in a transverse direction on a trolley frame 23,25 and 27, respectively. The left trolley frame 23 and the right trolley frame 25 include generally vertical back portions 29 and are slidably movable relative to the header subframe 19 upon which they are supported. The short trolley frame 27 is fixed to the header subframe 19 to prevent the short draper 26 from laterally shifting. By maintaining the short draper section 26 in a fixed position relative to the header subframe 19, the discharge opening 28 is kept inwardly of the right end of the header 15. The cutterbar 18 includes a pair of counter-reciprocating sickles 31,32 such as described in U.S. Pat. No. 3,577,716 granted to H. G. McCarty et al on May 4, 1971. The drive for reciprocating the sickles 31,32 begins at a centrally located source of rotational power (not shown) mounted on the tractor 11. Left and right shafts 33,34 rotatably supported by the header subframe 19 transfer the rotational power to a wobble unit 35 mounted at each respective end of the header 15. As is known in the art, the wobble unit 35 transforms the rotational input from the shafts 33,34 into a reciprocating output transferred by left and right wobble shafts 36,37 to the corresponding sickles 31,32.

The rotational drive mechanism 40 for powering the rotation of the draper 21 on the short draper section 26 is best seen in FIGS. 5 and 7. A driven pulley 42 is mounted on the right cutterbar drive shaft 34 for rotation therewith. A driven pulley 43 is affixed to a draper drive shaft 44 rotatably supported by the fixed trolley frame 27 for rotatably driving the draper 21c. An endless flexible belt 45 is entrained around the drive pulley 42 and the driven pulley 43 to transfer rotational power therebetween. It should be noted that the flexible belt 45 permits the transfer of power from one plane to a second plane generally perpendicularly disposed to the first plane. A tensioning idler 46 is mounted on a bracket 47 for engagement with the belt 45. The idler 46 is positionally movable relative to the bracket 47 along the line of the axis thereof to adjust and maintain proper tension in the belt 45. The bracket 47 is adjustable in two directions to permit movement of the tensioning idler 46 to properly align the idler 46 with the belt 45. The bracket 47 is mounted to the header subframe 19 by a pivot bolt 48 and a guide bolt 49 which are linearly movable within corresponding slot-shaped holes 51 formed within the header subframe 19. An arcuate slot 53 formed within the bracket 47 permits a pivotal movement of the bracket 47 about the pivot bolt 48 with the guide bolt 49 traveling within the arcuate slot 53. This two-way movement of the bracket 47 relative to the header subframe 19 permits an alignment between the idler 46 and the belt 45, due to the 90° change in the plane of rotation at opposing ends of the belt 45, to gain and maintain the proper attitude between the idler 46 and the belt 45.

The lateral shifting movements of the left and right draper sections 22,24 are operatively powered by the hydraulic cylinder 55. The barrel 56 of the cylinder 55 is affixed to the header subframe 19 so as to be stationary relative thereto. The ram 58 is extendable from both ends of the barrel 56. As best in FIG. 7, the ram 58 is connected to the left trolley frame 23 at the opposing transverse ends with the barrel 56 positioned therebetween. Accordingly, the hydraulic cylinder 55 also serves as a guide to help track the shifting movements of the left draper section 22 along the header subframe 19. The source of hydraulic power to the cylinder 55 will be discussed in further detail below.

The right draper section 24 is equipped with an inter-trolley latching mechanism 60 to selectively connect the right draper section 24 to the left draper section 22 so that the hydraulic shifting cylinder 55 can also power the lateral movement of the right draper section 24. Referring now to FIGS. 7, 8, 9 and 11, the latching mechanism 60 can best be seen. A latching member 62 is pivotally connected by a bolt 63 to the right trolley frame 25 and is cooperatively engageable with a securing tab 64 affixed to the left trolley frame 23 to connect the right draper section 24 to the left draper section 22. The latching member 62 includes a cam portion 66 and a hooking portion 68. Upon engagement with the securing tab 64, the cam portion 66 effects a pivotal rotation of the latching member 62 about the connecting bolt 63 so that the hooking portion 68 can engage the securing tab 64. A spring 65 interconnecting the right trolley frame 25 and the latching member 62 biases the latching member 62 into a position in which the cam portion 66 will engage the securing tab 64 when the left draper section is moved adjacent the right draper section 24. A plate 69 beneath the latching member 62 serves as a stop to limit the biased movement of the latching member 62.

Figure 9:
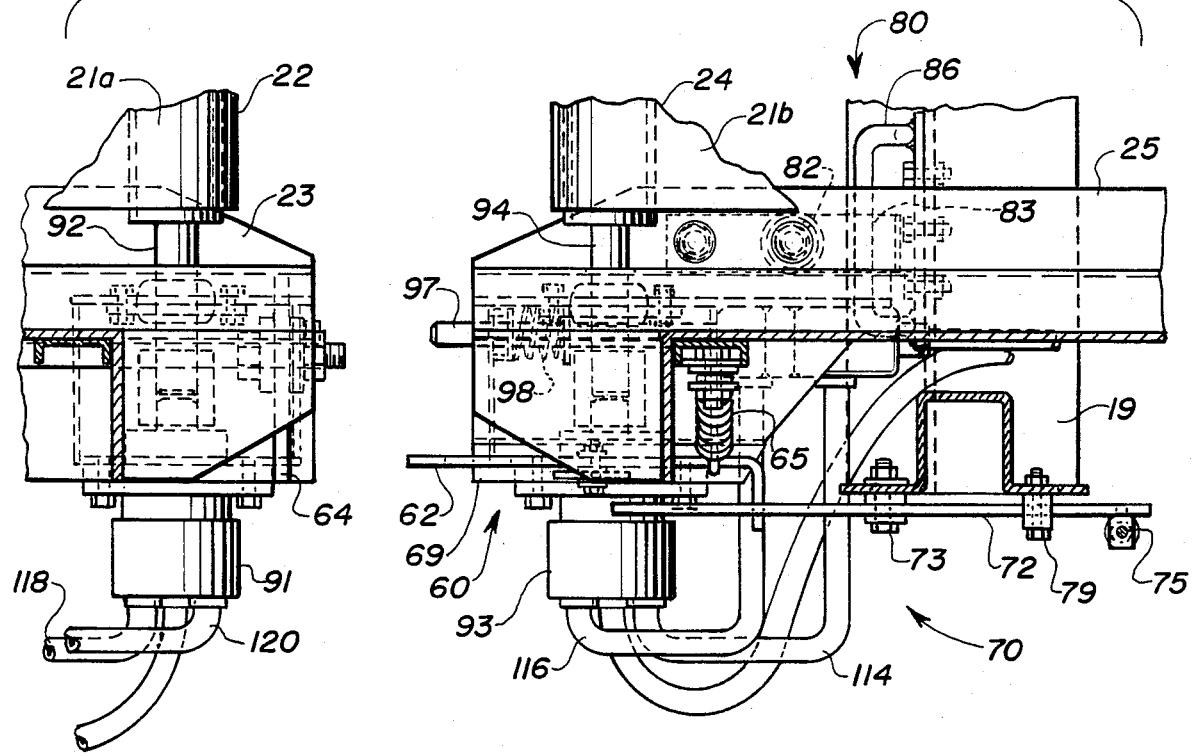
FIG. 9 is a partial top plan view of the central, rearward portion of the draper header corresponding to lines 9—9 of FIG. 8.

Accordingly, it can be seen that when the left draper section 22 is shifted by the hydraulic cylinder 55 to a position adjacent the right draper section 24, the latching mechanism 60 automatically connects the two draper sections 22,24 for a simultaneous movement by the cylinder 55. To unlatch the right draper section 24 from the left draper section 22, a release mechanism 70 is provided, which is best shown in FIGS. 8, 9 and 11. A trip link 72 is pivotally connected to the header subframe 19 by a connecting bolt 73. A cable 75 connected to the actuating end 76 of the trip link 72 extends into the operator's platform 13 to permit the operator to selectively control the rotation of the trip link 72 about the pivot 73. The opposing camming end 77 of the trip link 72 includes a cam surface 78 engageable with the latching member 62 to assure positioning of the trip link 72 above the latching member 62 when the right draper section 24 is in its extreme right transverse position. A stop bolt 79 is mounted on the header subframe 19 to limit the rotational movement of the trip link 72, primarily to keep the camming end 77 from dropping below a position necessary for proper engagement between the cam surface 78 and the latching member 62.

It should be noted that the release mechanism 70 is fixed relative to the header subframe 19, such that the release mechanism 70 can only operatively engage the latching mechanism 60 when the right draper section 24 is in its extreme right transverse position. By pulling on the cable 75, the operator can affect a pivotal rotation of the trip link 72 to exert a corresponding pivotal rotation of the latching member 62 and thereby cause the hooking portion 68 to release the securing tab 64 on the left draper section 22. Subsequent manipulation of the hydraulic cylinder 55 will move the left draper section 22 away from the right draper section 24 and complete the unlatching process. A release of the cable 75 allows the spring 65 to return the latching member 62 into an engagement position against the stop plate 69 and, thereby return the trip link 72 to its initial position.

As is best seen in FIGS. 8, 9 and 11, a retention mechanism 80 is provided to retain the right draper section 24 in its extreme right transverse position when not coupled to the left draper section 22. The retention mechanism 80 includes a spring clip 82 having a clasp 83 biased toward the right trolley frame 25 by the spring 84, and a looped retaining member 86 affixed to the header subframe 19 at a position to be engageable with a clasp 83. The spring 84 exerts sufficient force on the clasp 83 to prevent it from disengaging from the retaining member 86, keeping the right draper section 24 in its extreme right transverse position even under side hill conditions. However, the spring 84 is yieldable to the force exerted by the hydraulic cylinder 55 to permit the right draper section 24 to move in conjunction with the left draper section 22 when connected together by the latching mechanism 60.

Referring to FIGS. 7–15, it can be seen that the transverse rotative movement of the drapers 21a and 21b on the shiftable draper sections 22,24 are powered by hydraulic motors 91,93, respectively. Each motor 91,93 is connected to a corresponding draper drive shaft 92,94 to affect the rotation of the corresponding draper 21a,21b and is reversable with regard to the direction of rotation in accordance with the direction of the flow of hydraulic fluid through the motor 91,93, as will be described in further detail below. As is indicated in FIGS. 2–4, the desired direction of rotation of the drapers 21a,21b is dependent upon the relative positions between the draper sections 22,24 and the header subframe 19. When the draper sections 22,24 are connected together and are shifted into an extreme left transverse position, the direction of rotation of the drapers 21a,21b must convey crop material to the right toward the discharge opening 28. Similarly, when the draper sections 22,24 are connected together and are shifted into the extreme right transverse position, the drapers 21a,21b must rotate in the same direction to convey crop to the left. However, when the draper sections 22,24 are separated and each is in its respective extreme transverse position, the direction of rotation of the drapers 21a,21b must be in opposing directions to convey crop toward the discharge opening 28 at the central part of the header 15.

A reversing valve 95 is provided on the right draper section 24 in operative association with the hydraulic motor 93 to control the direction of rotation of the right draper 21b in response to the relative position of the left draper section 22. The reversing valve 95 includes a movable spool 96 to control the direction of hydraulic fluid through the right hydraulic motor 93 relative to the flow through the left hydraulic motor 91. Connected to the spool 96 is a spring loaded push rod 97 extending beyond the right trolley frame 25 to be engageable with the left trolley frame 23 to sense the proximate position thereof when the left draper section 22 has moved adjacent the right draper section 24. The spool 96 is biased by an internal spring (not shown) such that the push rod 97 is extended toward the left draper section 22, thereby directing the hydraulic fluid through the right hydraulic motor 93 in such a manner that the right draper 21b rotates in the opposite direction to the left draper 21a when the draper sections 22,24 are not connected together. The push rod 97 is constructed of a sensing member 97a positioned for telescopically receiving a second member 97b, which in turn is connected to the spool 96. A spring 98 biases the sensing member 97a and the second member 97b apart. Appropriately positioned washers 97c welded to the members 97a,97b cooperate with a collar 97d to retain the push rod 97 in an assembled condition. When the spool 96 bottoms out in the valve 95, the spring 98 will yield, permitting the members 97a,97b to move toward each other and, thereby accommodate any changes in the distance between the left trolley 23 and the right trolley 25 when they are moved adjacent one another. An actuation member 99 is provided on the left trolley frame 23 to engage the push rod 97 when the left draper section 22 moves next to the right draper section 24 and effect a movement of the spool 96.

A hydraulic circuit 100, connectable to a pump (not shown) appropriately mounted on the tractor 11, provides a source of hydraulic fluid under pressure to both hydraulic motors 91,93 and to the hydraulic cylinder 55. The inflow line 102 carries hydraulic fluid from the pump (not shown) to the primary valve 105. A solenoid control spool 106 electrically controlled by the operator from the operator's platform 13, controls the direction of fluid flow through the valve 105. The return line 104 returns the flow of hydraulic fluid from the valve 105 back to the tractor 11.

Referring now to the diagrammatic view seen in FIG. 13, when it is desirable to have the left draper section shifted to its extreme left transverse position, the solenoid controlled spool 106 is shifted to send the flow of fluid outwardly from the valve 105 through line 108. Hydraulic fluid arriving at the tee 109 can go through line 110 to the reversing valve 95 and ultimately to the hydraulic motors 91,93 or via line 112 to the hydraulic cylinder 55. Since the hydraulic circuit 100 is set up such that the hydraulic cylinder 55 requires less pressure to operate than the hydraulic motors 91,93, hydraulic fluid entering the tee 109 will flow through the line 112 until the hydraulic cylinder 55 has reached the end of its stroke, fluid returning through line 113 through valve 105 to the return line 104, thereby shifting the left draper section 22 to its extreme left transverse position before fluid will flow through line 110. Accordingly, after the cylinder 55 has reached the end of its stroke, fluid will stop flowing through line 112 and proceed through hydraulic line 110 to the reversing valve 95. If the draper sections 22,24 are disconnected and separated as diagrammatically indicated in FIG. 13, the reversing valve 95 will direct the flow of fluid from the valve 95 through line 114 to the hydraulic motor 93, back out line 116 through the reversing valve 95 and onto the left hydraulic motor 91 via line 118. The fluid is then returned to the reservoir (not shown) through line 120, the valve 105 and the return line 104.

It should be noted that in the flow path diagram in Fig. 13, the draper 21b is rotated in the opposite direction of draper 21a, as evidenced by arrows 121 and 122. The flow pattern diagrammed in FIG. 15 is similar to the flow pattern diagrammed in FIG. 13 except that the reversing valve changes the direction of fluid flow through the hydraulic motor 93 in the manner described above. After the hydraulic cylinder 55 has reached the end of its stroke shifting the draper sections 22,24 to the extreme left transverse position, hydraulic fluid flowing through line 110 enters the reversing valve 95 and is sent through line 116 to the hydraulic motor 93 and back out through line 114 to the reversing valve 95. This change in direction effects a rotation of the right draper 21b in the same direction as the left draper 21a, as shown by the directional arrows 123,124.

Referring now to the diagrammatic flow plan shown in Fig. 14, a shifting of the solenoid controlled spool 106 to cause the flow of fluid to 80 through line 126 from the valve 105 to the tee 125. As described above relative to FIG. 13, the flow of hydraulic fluid will flow through line 113 to cause the hydraulic cylinder 55 to work through the end of its stroke, shifting the left draper section 22 completely to the right, before actuating the hydraulic motors 91,93. When the hydraulic cylinder 55 has reached the end of its stroke, the draper sections 22,24 will be in the extreme right transverse position and the flow of fluid will proceed through line 120 to the left hydraulic motor 91. The hydraulic fluid 91 will then exit the hydraulic motor 91 through line 118 to the reversing valve 95 which has the spool 96 shifted such that the flow of fluid goes through line 114 to the right hydraulic motor 93, returning to the valve 95 through line 116 and then to the reservoir through line 110, valve 105 and return line 104.

As described relative to FIGS. 13–15 above, it can be seen that the hydraulic circuit 100 effects a shifting of the draper sections 22,24 completely into the respective transverse positions before starting the rotation of the respective drapers. To shift the draper sections 22,24 such that the discharge opening 28 is centrally located between the draper sections 22,24, it is necessary that the right draper section 24 be shifted into its extreme right transverse position to enable the retention mechanism 80 to hold the right draper section 24 in a fixed position relative to the header subframe 19. Then the release mechanism 70 is actuated through the cable 75 to unlatch the latching mechanism 60 and permit the left draper section 22 to be separated from the right draper section 24 by manipulating the hydraulic cylinder 55. After the hydraulic cylinder 55 has completed its stroke moving the left draper section 22 to its extreme left transverse position, the flow of hydraulic fluid will be diverted to the hydraulic motors 91,93 to rotate the drapers 21a,21b. To affect a shifting of both drapers 22,24 to the extreme left transverse position, the operator must connect the two draper sections 22,24 by moving the left draper section 22 adjacent the right draper section 24 through manipulation of the hydraulic cylinder 55. After the latching mechanism 60 has connected the two draper sections 22,24 together, the hydraulic cylinder 55 can be manipulated to shift both draper sections 22,24 to the extreme left transverse position. Likewise, the appropriate manipulation of the hydraulic cylinder can also move both draper sections 22,24 to the extreme right transverse position.

It will be understood that changes in the details, materials, steps and arrangements of parts which have been described and illustrated to explain the nature of the invention will occur to and may be made by those skilled in the art upon a reading of this disclosure within the principles of the scope of the invention. The foregoing description illustrates the preferred embodiment of the invention; however, concepts, as based on the description, may be employed in other embodiments without departing from the scope of the invention. Accordingly, the following claims are intended to protect the invention broadly, as well as in the specific form shown.

Having thus described the invention, what is claimed is:

1. In a crop harvesting machine having a mobile frame adapted for movement across a field; a header connected to said frame to collect crop material from the ground and initiate the crop harvesting process, said header having first and second laterally shiftable draper sections, each said draper section including a draper rotatable in a transverse direction to laterally convey crop material thereon, each said draper section being laterally shiftable between a left position and a right position; first and second hydraulic motors operatively connected to said first and second drapers, respectively, for the selective rotation thereof in first and second opposing directions; and a hydraulic circuit for supplying hydraulic fluid under pressure to said hydraulic motors, the improvement comprising:
   a reversing valve connected to said hydraulic circuit in association with said second hydraulic motor for reversing the flow of fluid through said second motor to cause said second draper to rotate in a direction opposite to the direction of rotation of said first draper under conditions where said first draper section and said second draper section are in opposing positions, creating a gap therebetween; and means for sensing when said first and second draper sections are in opposing positions.

2. The crop harvesting machine of claim 1 wherein said means for sensing includes a push rod mounted on said second draper section and positioned to be engageable with said first draper section when said draper sections are in adjacent positions.

3. The crop harvesting machine of claim 2 wherein said reversing valve includes a movable spool mounted therein to control the direction of fluid flow through said second hydraulic motor, said push rod being connected to said spool.

4. The crop harvesting machine of claim 3 wherein said push rod moves upon engagement with said first draper section to effect a movement of said reversing valve spool when said first draper section moves adjacent said second draper section.

5. The crop harvesting machine of claim 4 wherein said reversing valve spool is biased toward a first position wherein the flow of fluid is directed through said second hydraulic motor to cause rotation of said second draper in a direction opposite to the direction of rotation of said first draper.

6. The crop harvesting machine of claim 5 wherein the movement of said spool to said first position causes said push rod to move toward said first draper section, said first draper section preventing said push rod and said spool from moving from a second position, wherein the flow of fluid effects a rotation of said second draper in the same direction as said first draper, to said first position when said first draper section is positioned adjacent said second draper section.

7. The crop harvesting machine of claim 6 wherein said reversing valve includes an internal spring biasing said spool toward said first position.

8. The crop harvesting machine of claim 7 wherein said push rod includes a sensing member positionable externally of said second draper for engagement with said first draper, a second member connected to said reversing valve spool and telescopically receivable within said sensing member, and a second spring disposed between said sensing member and second member to bias said sensing member and said second member part.

9. The crop harvesting machine of claim 8 wherein said second spring is stiffer than the internal spring within said reversign valve, said second spring permitting a telescopic shortening of said push rod to accommodate relative positional variances between said first and second drapers after said reversing valve spool has completely moved to said second position.

10. A crop harvesting machine for harvesting crop material from a field comprising:
a mobile frame adapted for movement over the field;
a header connected to said frame to collect crop material from the field and initiate the crop harvesting process;
first and second transversely shiftable draper sections mounted on said header, each said draper section including a draper mounted thereon for rotation in a transverse direction to laterally convey crop material thereon, said draper sections being shiftable in corresponding transverse directions and in opposing directions to create a crop discharge opening therebetween;
first and second hydraulic motors operatively connected to said first and second drapers, respectively, for the selective rotation thereof in first and second opposing transverse directions;
a hydraulic circuit for supplying hydraulic fluid under pressure to said hydraulic motors;
a reversing valve connected to said hydraulic circuit in association with said second hydraulic motor for reversing the flow of hydraulic fluid through said second hydraulic motor to cause said second draper to rotate in said first and second directions in response to the relative position of said first draper section; and
means for sensing the position of said first draper section relative to said second draper section, said means for sensing actuating said reversing valve to effect the change in rotation of said second draper between said first and second directions.

11. The crop harvesting machine of claim 10 wherein said reversing valve includes a movable spool to change the flow of fluid through said second hydraulic motor, said spool being biased toward a first position wherein said second hydraulic motor rotates said second draper in a transverse direction opposite to the direction of rotation of said first draper.

12. The crop harvesting machine of claim 11 wherein said means for sensing includes a push rod having a sensing member projectable outwardly from said second draper section toward said first draper section, a second member connected to said spool and telescopically receivable within said sensing member and a spring interdisposed between said sensing member and said second member to bias said members apart, said spring being yieldable to permit said second member to move telescopically within said sensing member, shortening the overall length of said push rod to accommodate positional variances between said first and second draper sections.

13. The crop harvesting machine of claim 12 wherein said first draper section engages said sensing member when said first draper section moves adjacent said second draper section to effect movement of said reversing valve spool from said first position to a second position wherein said second hydraulic motor rotates said second draper in the same transverse direction as said first draper.

14. The crop harvesting machine of claim 13 wherein said first draper section is provided with an actuation member for engagement of said sensing member when said first draper section moves adjacent said second draper section.

15. The crop harvesting machine of claim 14 wherein said hydraulic circuit includes a second valve for simultaneously reversing the flow of hydraulic fluid to both said hydraulic motors to change the direction of rotation of both said first and second drapers simultaneously.

* * * * *